R. E. HELLMUND.
SYSTEM OF CONTROL.
APPLICATION FILED SEPT. 9, 1915.

1,292,602.

Patented Jan. 28, 1919.

Fig. 1.

Fig. 2.

|  | a | b | c | d | e | f | g | h |
|---|---|---|---|---|---|---|---|---|
| Acc. – Weak Field | O | O | O | O |  |  | O | O |
| Acc. – Medium Field |  | O | O |  |  |  | O | O |
| Acc. – Strong Field | O |  |  | O |  |  | O | O |
| Transition to Regen. | O |  |  | O | O | O | O | O |
| Reg. – Weak Field | O | O | O | O |  |  |  | O |
| Reg. – Medium Field |  | O | O |  |  |  |  | O |
| Reg. – Strong Field | O |  |  | O | O |  |  | O |

WITNESSES:
R.J. Fitzgerald
W.R. Coley

INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,292,602.  Specification of Letters Patent.  Patented Jan. 28, 1919.

Application filed September 9, 1915. Serial No. 49,755.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to dynamo-electric machines, and it has special reference to phase-advancing means for effecting power-factor compensations in polyphase induction motors.

One object of my invention is to provide a system of the above-indicated character which shall be simple in arrangement of circuit connections and operation, which may be readily adjusted for varying degrees of compensations and which, moreover, is adapted to perform its intended functions whether the induction motor to be regulated is operating as a motor or as a generator.

Another object of my invention is to provide a control system of the class referred to which embodies a phase advancer that is connected in series circuit between the secondary windings of the induction motor to be regulated and a polyphase interconnected rheostatic device, by means of which the motor operation is governed, whereby the phase advancer and governing rheostat may be operated concurrently.

More specifically, it is an object of my invention to provide simple means for adapting the phase advancer for suitable power-factor compensations for the induction motor when operating as a motor or as a generator and which involves merely the reversal of the connections or one of the phase windings of the phase advancer, being particularly applicable to three-phase operation.

When phase advancers have been used in the prior art for regulating the operation of three-phase induction motors that are adapted to be operated as generators and in connection with the three-phase inter-connected governing rheostats, the phase advancers have been adapted to effect proper compensations for motor or generator operation either by reversing the direction of operation of their driving motors or by interchanging two of the secondary phases of the motor to be regulated.

In some cases, however, it is not feasible to reverse the driving motors, as, for instance, when a phase advancer is driven directly by a phase converter such as is employed upon certain classes of electric locomotives for the purpose of converting single-phase energy into polyphase energy. On the other hand, an interchanging of phases necessitates either a temporary interruption of the motor current which results in an interruption of the torque developed and is, therefore, objectionable, or necessitates a temporary short-circuit of the induction motor which excludes the secondary accelerating resistance and produces excessive and damaging currents and motor torques.

It is the purpose of my present invention to accomplish the desirable results hereinbefore mentioned and to obviate the difficulties referred to which have been incident to prior systems of this general character.

In the accompanying drawing, Figure 1 is a diagrammatic view of a system of control embodying my invention, and Fig. 2 is a chart showing the positions of various switches under different operating conditions that may be obtained with the system illustrated.

Referring to the drawing, the system shown comprises a plurality of supply-circuit conductors 1, 2 and 3, a polyphase induction motor M having star-connected primary windings P and similar secondary windings S, a regulating rheostat R for governing the operation of the motor M, a phase advancer PA that is adapted to be connected between the secondary windings S and the rheostat R for effecting power-factor compensations in the motor M, a driving motor 5 for operating said phase advancer, and a plurality of electrically-operated unit switches $a$, $b$, $c$, $d$, $e$, $f$ and $g$ for governing the circuit connections of the phase advancer PA and regulating resistor R.

While I have illustrated a three-phase induction motor M having star-connected primary and secondary windings, my invention is not so restricted, as delta-connected windings may be equally well employed. The motor M may, therefore, be of any suitable form and it is adapted to be driven by its load for operation as a generator, as in the case of certain classes of railway motors of flywheel sets.

The regulating rheostat device R may be of any desired form, inasmuch as it forms no part of my present invention except as it performs a necessary function in the operation of the system, and, as shown, comprises a single electrolyte-containing tank 7 and a plurality of electrodes 8 that are adapted to be immersed therein for governing the acceleration of the motor M in accordance with the usual practice.

The phase advancer PA is of the well-known Leblanc type and comprises a magnetizable field member 10, a plurality of exciting windings 11 and 12 associated therewith, an armature 13 having separate and independent armature windings that are severally connected to commutator cylinders 14 and 15 with which sets of brushes 16 and 17, that are disposed in quadrature, coöperate in the usual manner. The armature 13 is operated by means of the driving motor 5 through a shaft 18 or other suitable means, and said motor 5 may conveniently be supplied with energy from one phase of the three-phase supply circuits 1, 2 and 3. The field-magnet winding 11 is permanently connected in series circuit with the armature winding that is associated with the set of brushes 16, while the exciting winding 12 is similarly connected with the armature winding that is associated with the set of brushes 17.

The several electrically operated switches $a$ to $g$, inclusive, may be of any form familiar in the art, and the operation thereof may be conveniently governed through the agency of a suitable master controller (not shown) which is designed and adapted to effect the closure of said unit switches in accordance with the chart shown in Fig. 2 in order to establish the proper circuit relations of the system for different operating conditions thereof. In fact, in lieu of the set of unit switches and governing master controller, such as referred to, a main circuit controller having coöperating contact members corresponding to the switches illustrated may be employed for effecting the desired circuit connections. Inasmuch as those skilled in the art would have no difficulty in providing a controller for effecting the closure of the various switches as set forth in the sequence chart shown in Fig. 2, it is deemed sufficient for a full and ready understanding of the invention to omit illustrating a controller of any form whatsoever.

It is a well-known fact that, in the illustrated type of phase advancer, a relatively weak field excitation therefor is required under normal or full-load conditions, while a relatively heavy field excitation therefor is necessary when the induction motor is operating under light-load conditions; also that, when a relatively low resistance is included in the secondary circuit of the induction motor, accompanied by relatively low secondary frequency, a light field excitation for the phase advancer is required, while, in case a relatively heavy resistance is connected in the secondary circuit, accompanied by relatively high secondary frequency, a correspondingly heavy field excitation for the phase advancer is necessary. For intermediate loads or secondary frequency, it will be understood that the phase-advancer field excitation should vary proportionately, in accordance with the principles mentioned.

Assuming the circuit connections and various parts of the apparatus to occupy the positions shown in the drawing, and that the polyphase machine M is being accelerated as a motor to drive a suitable load, adjustments for the desired power-factor compensations may be effected as follows: In the event that the motor M is operating under substantially full load and, therefore, a relatively weak phase-advancer field excitation is required, the controller (not shown) is moved to a position corresponding to that indicated in Fig. 2 and marked "Acc-Weak field", whereupon the unit switches $a$, $b$, $c$, $d$, $f$ and $g$ are energized and closed. Thus, the following circuits are completed from the several secondary phase windings A, B and C of the motor M; one circuit traversing the phase A, unit switch $b$, and armature winding associated with the set of brushes 16 to one of the electrodes 8 of the rheostat R; another circuit traversing phase winding B, switch $f$, armature winding associated with the set of brushes 17, unit switch $c$ and the unit switch $g$ to another electrode of the rheostat R, and a third circuit being established from the phase winding C directly to the remaining electrode 8 of said rheostat. Moreover, the field-magnet winding 11 is short-circuited upon itself through the unit switches $a$ and $b$, while the field-magnet winding 12 is also closed in a local circuit through the unit switches $c$ and $d$.

Hence, a corrective voltage is induced across the set of brushes 17 by reason of the field that is produced by the current traversing the armature winding that is associated with the brushes 16, in accordance with well-known principles. Moreover, this induced voltage is in phase with the voltage of the phase winding A and is introduced into the circuit of the phase winding B. Similarly, a voltage is induced across the brushes 16 and into the circuit of the phase winding A by reason of the field produced by the current traversing the armature winding that is associated with the set of brushes 17, and this corrective voltage is in phase with the voltage of the winding B, as will be understood.

By combining the corrective voltages induced in the respective phase windings A and B, a resultant voltage of the desired phase position and magnitude is produced in the phase winding C, as is fully explained in my co-pending application, Serial No. 49,754, filed of even date herewith. It is not deemed necessary to set forth herein the theory of operation referred to since my invention may be readily comprehended without reference thereto.

By reason of the fact that the exciting windings 11 and 12 are short-circuited upon themselves, a damping action results therein which tends to counteract the respective fields that are developed within the armature 13 by means of the currents traversing the several armature windings and, therefore, the induced corrective voltages across the several sets of brushes is materially reduced.

If the motor M is only partially loaded and a field of only medium strength in the phase advances PA is necessary for effecting the desired compensations, the controller (not shown) is moved to a position corresponding to that indicated in Fig. 2 by "Acc-Medium field". Thus, the unit switches $b$, $c$, $f$, and $g$ are closed and the following circuits established: one from the secondary phase winding A which includes unit switch $b$ and armature winding associated with the brushes 16 to the rheostat R, another circuit from phase winding B which includes unit switch $f$, armature winding associated with brushes 17, unit switch $c$ and unit switch $g$ to the rheostat, and a third circuit from phase winding C directly to the rheostat. Upon the completion of these circuits, the respective armature windings associated with the brushes 16 and 17 are connected directly in series circuit between the phase windings A and B and the regulating rheostat R, whereby the corrective voltages induced therein are dependent entirely upon the mutual action of the currents traversing said windings, the field-magnet windings 11 and 12 being open-circuited and inoperative. Under these conditions, the induced corrective voltages are of somewhat greater magnitude than in the first instance, by reason of the fact that there is no damping action and, hence, compensations for relatively greater loads may be effected.

In the event that the motor M is running light, under which circumstances the greatest degree of correction and relatively heavy phase-advancer excitation is necessary, the controller, (not shown) is moved to its position "Acc-Strong field" whereby the switches $b$ and $c$ are dropped out and the switches $a$ and $d$ closed, while the switches $f$ and $g$ are maintained in their first position. The closure of switch $a$ serves to include the field-magnet winding 11 in series circuit with the armature winding that is associated with the set of brushes 16, while the closure of switch $d$ similarly connects the field-magnet winding 12 in series circuit with the armature winding that is associated with the other set of brushes 17, while the other circuit connections remain unchanged. Thus, the corrective voltages induced in the respective armature windings are augmented by reason of the additional excitation furnished by the field-magnet windings 11 and 12, whereby greater power-factor compensations are possible.

Assuming that the machine M is now driven by its load, or in some other manner, to cause it to operate as a generator, it becomes necessary to reverse the action of the phase advancer PA in order to effect the desired power-factor compensations. I propose to accomplish this result by temporarily short-circuiting one of the phases of the phase advancer and subsequently reconnecting that phase in reversed direction. By so doing, the action of both phases of the phase advancer will be reversed, inasmuch as a reversal of one of the phases effects the reversal of the corrective voltage induced therein while it also reverses the corrective voltage that is developed in the other phase.

The change-over of circuit connections referred to, is effected by moving the controller (not shown) to its transition position, in which the additional switches $e$ and $h$ are closed, thereby short-circuiting the phase of the advancer PA that includes the exciting field 12 and the armature winding that is associated with the set of brushes 17 by means of one circuit which includes unit switches $f$ and $h$ and another circuit which includes unit switches $e$ and $g$. The phase advancer PA, therefore, is temporarily rendered inoperative during the transition from the accelerating to the regenerating operation, although the regulating rheostat R may be utilized to perform its intended functions.

After establishing the transition connections, as set forth, the controller (not shown) may be moved to any of its regenerative positions to obtain the proper phase compensation to meet the particular operating conditions. For purposes of explanation, it may be assumed that a light regenerative load is carried by the motor M, now acting as a generator, which condition requires a heavy compensation in order to bring the power factor up to a satisfactory value. Therefore, the controller (not shown) is moved in to its position "Reg-Strong field", whereby the unit switches $a$, $d$, $e$, and $h$ are closed.

Upon the closure of the switches mentioned, a circuit is established from the secondary phase winding A which includes switch $a$, field-magnet winding 11, and armature winding that is associated with brushes 16 to the rheostat R; another circuit is completed from the phase winding B which includes switches e, and d, field-magnet winding 12, armature winding that is associated with brushes 17, and switch h to the resistor R, and a third circuit is completed from the phase winding C to the rheostat. In this way, the respective auxiliary exciting windings 11 and 12 are connected in series circuit with the armature windings that are respectively associated with the brushes 16 and 17, and, therefore, the armature windings are supplemented by the auxiliary exciting windings to produce a strong field in the phase advancer PA for inducing relatively large correcting voltages for the purpose of power-factor compensations.

Without further detailed description, it will be understood that, in position "Reg-Medium field", switches b, c, e and h are closed whereby only the armature windings associated with the brushes 16 and 17 are active for inducing correcting voltages, while the field windings 11 and 12 are open-circuited and are inoperative. Moreover, in position "Reg-Weak field", corresponding to relatively heavy load on the generating machine, switches a, b, c, d, e, and h are closed, whereby the auxiliary exciting field magnet windings 11 and 12 are also short-circuited upon themselves, and, hence, a damping action results which tends to neutralize the exciting fields produced in the armature of the phase advancer PA, whence the induced correcting voltages across the several sets of brushes 16 and 17 are correspondingly reduced. Thus, the power-factor compensation is relatively small.

It is evident, therefore, that suitable power factor compensations may be effected, both during accelerating and regenerating periods, to meet any load conditions, while the change-over of the phase advancer connections is accomplished with facility and without subjecting the system to undesirable circuit conditions, but merely necessitating the temporary interruption of the phase-advancing regulation.

Obviously, many modifications in the arrangement of parts and circuit connections and mode of operation of my invention may be effected without departing from the spirit and scope thereof, and I aim to cover such modifications in the appended claims.

I claim as my invention:

1. In a three-phase alternating-current system, dynamically interlinked means for producing component dephasing electromotive forces in two of the phases, said electromotive forces combining to produce a resultant dephasing electromotive force in the remaining phase, and means whereby one of said component electromotive forces may be reversed, whereby the remaining dephasing electromotive force and said resultant electromotive force are also reversed.

2. A dynamo-electric phase advancer comprising a single armature, two separate phase windings therefor, means for fixing the magnetic axes of said windings in space and in electrical quadrature to each other, a field-magnet structure and a plurality of exciting windings therefor connected in series circuit with the respective armature windings, each of said armature windings producing a rotational electromotive force in the other winding in phase with its own current, and means for reversing the connections of one of said armature windings and its associated exciting winding whereby the action of the phase-advancer is reversed.

3. In a control system, the combination with a polyphase induction motor having a three-phase secondary winding, a regulating rheostatic device for governing the operation thereof, and phase-advancing means having two electrically independent but dynamically related windings respectively connected in series circuit between two of the motor secondary windings and the regulating device, said windings having induced therein dephasing electromotive forces which jointly produce a similar dephasing electromotive force in the remaining phase, of switching means for reversing the connections of one of the windings of said phase-advancing means whereby the dephasing electromotive force in said phase is reversed and also the remaining dephasing electromotive forces.

4. In a control system, the combination with a polyphase induction motor having primary and secondary windings, and dynamo-electric phase-advancing means associated with the secondary windings and comprising a pair of distinct armature windings and a pair of distinct field-magnet windings, of controllable means for short-circuiting the field-magnet windings and connecting the separate armature windings in series circuit with distinct secondary phases of the motor, for open-circuiting said field-magnet windings, and for connecting said field-magnet windings in series circuit with the respective armature windings of said phase-advancing means, whereby the compensating effect thereof is adjusted.

5. The combination with a dynamo-electric machine of the induction type provided with a three-phase secondary winding, of means coupled to said machine and adapted to either absorb energy therefrom or to impart energy thereto, a control resistor, leads from the respective terminals of said secondary winding to said resistor, means for producing phase-modifying electromotive forces in two of said leads having a relative phase-displacement of 120°, whereby the triangle of secondary electromotive forces is displaced in position, and means for reversing the direction of current flow through one phase-modifying means, the remaining phase-modifying means being so related thereto that the phase-modifying electromotive force thereof is simultaneously reversed, whereby the direction of displacement of said voltage triangle is also reversed.

6. The combination with a dynamo-electric machine of the induction type provided with a three-phase secondary winding, of means coupled to said machine and adapted to either absorb energy therefrom or to impart energy thereto, a control resistor, leads from the respective terminals of said secondary winding to said resistor, an auxiliary dynamo-electric machine embodying two armature windings and commutators connected to said armature windings and having their brushes disposed in electrical quadrature, whereby transformer action between said windings is eliminated, each winding being disposed to cut the field of the other and to maintain a rotational electromotive force at its terminals proportional to said cutting, two of said leads including said armature windings, respectively, whereby phase modifying electromotive forces having a relative phase-displacement of 120° are induced in said leads, and the triangle of electromotive forces of said secondary electromotive forces is displaced in one direction, means for driving said auxiliary machine, and means for reversing the connections of one lead to its armature winding, whereby the electromotive forces of both windings are reversed and also the direction of displacement of said triangle.

In testimony whereof, I have hereunto subscribed my name this 31st day of Aug. 1915.

RUDOLF E. HELLMUND.